US010836245B1

(12) United States Patent
Adkins

(10) Patent No.: US 10,836,245 B1
(45) Date of Patent: Nov. 17, 2020

(54) HYDRAULIC ENERGY COLLECTION SYSTEM

(71) Applicant: John L. Adkins, Hazard, KY (US)

(72) Inventor: John L. Adkins, Hazard, KY (US)

(73) Assignee: John L. Adkins, Hazard, KY (US)

( * ) Notice: Subject to any disclaimer, the term of this patent is extended or adjusted under 35 U.S.C. 154(b) by 0 days.

(21) Appl. No.: 16/719,078

(22) Filed: Dec. 18, 2019

(51) Int. Cl.
| B60K 6/12 | (2006.01) |
| E02F 9/22 | (2006.01) |
| F01D 17/26 | (2006.01) |
| F02B 63/04 | (2006.01) |
| F03G 7/08 | (2006.01) |
| F15B 21/14 | (2006.01) |

(52) U.S. Cl.
CPC .............. *B60K 6/12* (2013.01); *E02F 9/2217* (2013.01); *F01D 17/26* (2013.01); *F02B 63/04* (2013.01); *F03G 7/08* (2013.01); *F15B 21/14* (2013.01); *B60G 2202/413* (2013.01); *F15B 2211/20546* (2013.01); *F15B 2211/7053* (2013.01); *F15B 2211/88* (2013.01)

(58) Field of Classification Search
CPC .......... B60K 6/12; E02F 9/2217; F15B 21/14; F15B 2211/88; F15B 2211/20546; F15B 2211/7053; B60G 2202/413
See application file for complete search history.

(56) References Cited

U.S. PATENT DOCUMENTS

| 4,339,920 A | 7/1982 | Le Van | |
| 6,172,426 B1 | 1/2001 | Galich | |
| 6,376,925 B1 * | 4/2002 | Galich | F03G 7/08 |
| | | | 290/1 R |
| 6,949,840 B2 | 9/2005 | Ricketts | |
| 2005/0200132 A1 * | 9/2005 | Kenney | F04B 17/00 |
| | | | 290/1 R |
| 2007/0264081 A1 * | 11/2007 | Chiu | E01C 9/007 |
| | | | 404/71 |
| 2012/0248788 A1 * | 10/2012 | Pirisi | H02K 7/1876 |
| | | | 290/1 R |

FOREIGN PATENT DOCUMENTS

WO 2007013998 A2 1/2007

OTHER PUBLICATIONS

Gupta et al. "Hydraulic Speed Breaker Power Generator," Int. Journal of Engineering Research and Applications, vol. 3, Issue 6, Nov.-Dec. 2013. pp. 502-506.
Ravivarma et al. "Power Generation Using Hydraulic Mechanism at Speed Bumper," International Journal of Scientific & Engineering Research, vol. 4, Issue 6, Jun. 2013. pp. 258-266.
Obeid et al. "Design and Motion Modeling of an Electromagnetic Hydraulic Power Hump Harvester," Advances in Mechanical Engineering, vol. 2014, 11 Pages.

\* cited by examiner

Primary Examiner — Tulsidas C Patel
Assistant Examiner — Joseph Ortega
(74) Attorney, Agent, or Firm — Meunier Carlin & Curfman LLC

(57) ABSTRACT

Disclosed and described herein are embodiments of a system that is embedded in a roadway such that a vehicle traveling over the system compresses a hydraulic fluid, which is used to perform work.

20 Claims, 6 Drawing Sheets

HYDRAULIC ENERGY COLLECTION SYSTEM

BACKGROUND

Energy is being expended all around us. For example, vehicles traveling on roadways create heat, friction, force, noise, etc. that is rarely or only partially captured. Given that many resources of this planet are finite, it is desirable to capture energy where possible to be used for performing useful work.

Therefore, what is needed is a system that overcomes challenges in the art, some of which are described above. In particular, what is needed is a system that captures energy created by vehicles traveling on a roadway such that the energy can be used to perform useful work.

SUMMARY

Disclosed and described herein are embodiments of a system that is embedded in a roadway such that a vehicle traveling over the system compresses a hydraulic fluid, which is used to perform work. One embodiment of a system for compressing a hydraulic fluid used for performing work comprises a first plate having a first-plate first hinged edge and a first-plate second edge opposite the first-plate first hinged edge; a second plate having a second-plate first hinged edge and a second-plate second edge opposite the second-plate first hinged edge, wherein the first-plate second edge and the second-plate second edge are proximate to one another and wherein the first plate and the second plate are embedded in a roadway; one or more springs in communication with a first side of the first plate and a first side of the second plate, wherein the one or more springs are configured such that in an uncompressed state the one or more springs elevate the first-plate second edge and the second-plate second edge to an elevation greater than an elevation of the first-plate first hinged edge and the second-plate hinged edge and wherein the elevation of the first-plate second edge and the second-plate second edge is approximately the same; one or more hydraulic actuators in communication with at least one of the first side of the first plate and/or the first side of the second plate, wherein a force acting on a second side of the elevated first-plate second edge and/or a second side of the elevated second-plate second edge causes the first-plate second edge and/or the second-plate second edge to de-elevate to a position such that the one or more springs are compressed and the one or more hydraulic actuators compress a hydraulic fluid that is used to perform work; and a stop, wherein the stop prevents the force acting on the second side of the elevated first-plate second edge and/or the second side of the second-plate second edge from de-elevating the first-plate second edge and/or the second-plate second edge beyond a defined point.

Additional aspects and advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
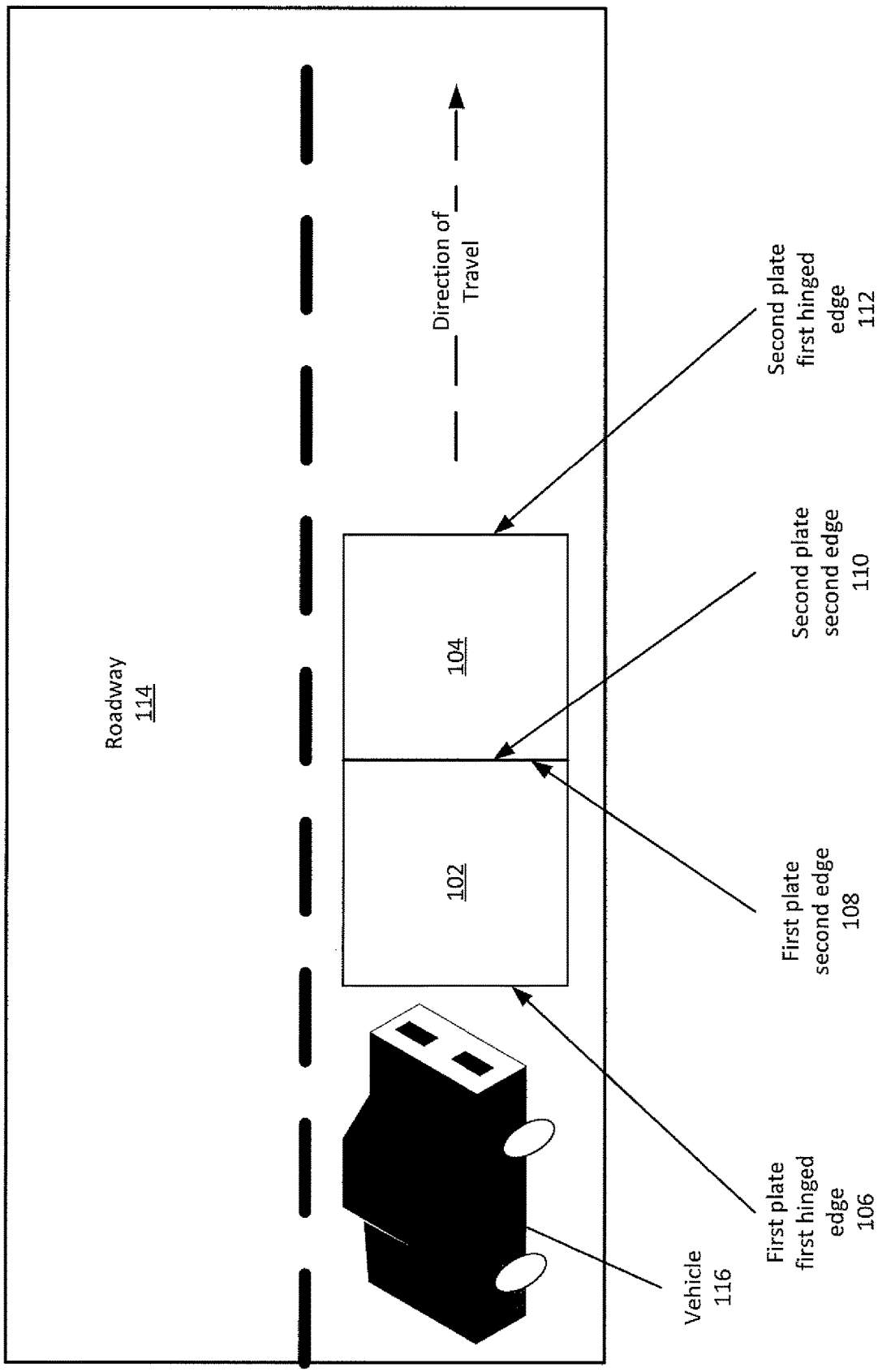
FIG. 1 illustrates a plan view of an embodiment of a system for compressing a hydraulic fluid used for performing work.

FIG. 1 illustrates a plan view of an embodiment of a system for compressing a hydraulic fluid used for performing work. As shown in FIG. 1, this embodiment of the system is comprised of two plates, a first plate 102 and a second plate 104. The plates 102, 104 are comprised of material of sufficient strength to pass forces through them with deforming or damaging the plates 102, 104. For example, the plates 102, 104 may be comprised of metal such as steel or iron, concrete, combinations thereof, and the like. In some instances the plates 102, 104 may be comprised of layers of different material such as steel, reinforced concrete and asphalt. Each plate 102, 104 has a first hinged edge and a second edge opposite the first plate first hinged edge 106. For example, the first plate 102 has a first plate first hinged edge 106 and a first plate second edge 108. Similarly, the second plate 104 has a second plate first hinged edge 112 and a second plate second edge 110 that is opposite the second plate first hinged edge 112.

As shown in FIG. 1, the system is embedded in a roadway 114. When in an idle (or upstroke) position, described in greater detail herein, the first plate second edge 108 and the second plate second edge 110 are elevated relative to the elevation of the first plate first hinged edge 106 and the second plate first hinged edge 112. In some instances, an angle formed between a plane of the roadway 114 and the elevated first-plate second edge 108 by the first-plate first hinged edge 106 does not exceed 5 degrees. Similarly, in some instances an angle formed between a plane of the roadway 114 and the elevated second-plate second edge 110 by the second-plate first hinged edge 112 does not exceed 5 degrees.

Therefore, a vehicle 116 traveling in the direction of travel shown in FIG. 1 compresses the first plate 102 such that it is approximately at the level of the first plate first hinged edge 106 and then the vehicle compresses the second plate 104 such that it is approximately at the level of the second plate first hinged edge 112. While the first plate second edge 108 and the second plate second edge 110 are generally proximate to one another without overlapping or touching, in some instances, and based on a direction of vehicular travel, one plate may overlap the other or one plate may comprise an extension 118 that overlaps the other. For example, in FIG. 1, the first plate 102 may overlap the second plate 104 or the first plate 102 may comprise an extension that overlaps the second plate 104. Therefore, as the vehicle begins traveling over the first plate 102, both the first plate 102 and the second plate 104 are compress simultaneously. This may decrease any force imparted on the vehicle 116 as its tires encounter the second plate 104.

Figure 2:
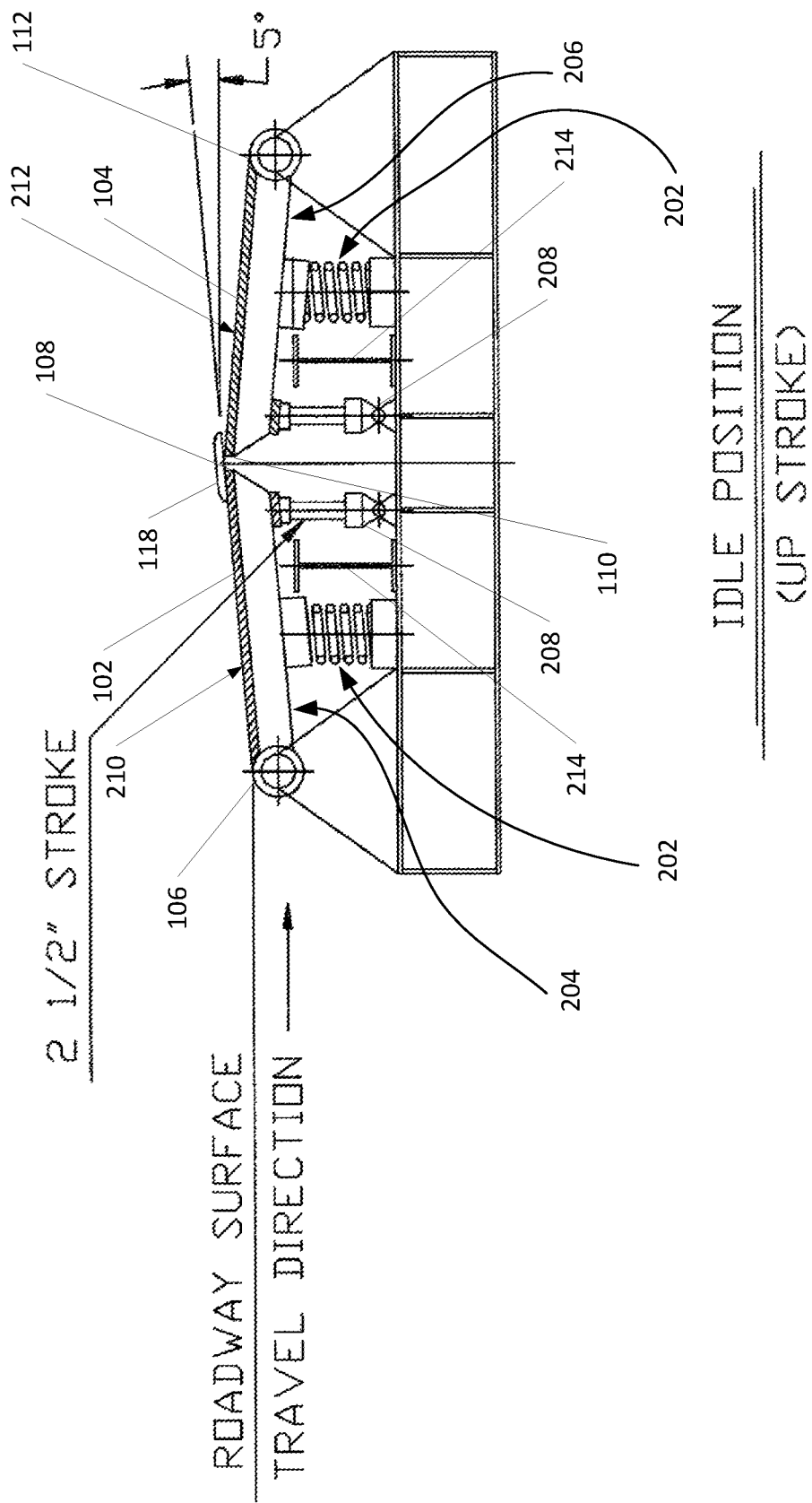
FIG. 2 is an elevation view of an embodiment of a system for compressing a hydraulic fluid used for performing work showing the system in an idle (or upstroke) position.

FIG. 2 is an elevation view of an embodiment of a system for compressing a hydraulic fluid used for performing work showing the system in an idle (or upstroke) position. As shown in FIG. 2, the system is comprised of a first plate 102 having a first-plate first hinged edge 106 and a first-plate second edge 108 opposite the first-plate first hinged edge 106. The system further comprises a second plate 104 having a second-plate first hinged edge 112 and a second-plate edge 110 opposite the second-plate first hinged edge 112, wherein the first-plate second edge 108 and the second-plate second edge 110 are proximate to one another and wherein the first plate 102 and the second plate 104 are embedded in a roadway 114. Further comprising the system are one or more springs 202 in communication with a first side 204 of the first plate 102 and a first side of 206 the second plate 104, wherein the one or more springs 202 are configured such that in an uncompressed state (i.e., idle position or upstroke), the one or more springs 202 elevate the first-plate second edge 108 and the second-plate second edge 110 to an elevation greater than an elevation of the first-plate first hinged edge 106 and the second-plate first hinged edge 112 and wherein the elevation of the first-plate second edge 108 and the second-plate second edge 110 is approximately the same.

Further comprising the system shown in FIG. 2 is one or more hydraulic actuators 208 in communication with at least one of the first side 204 of the first plate 102 and/or the first side 206 of the second plate 104, wherein a force acting on a second side 210 of the elevated first-plate second edge 108 and/or a second side 212 of the elevated second-plate second edge 110 causes the first-plate second edge 108 and/or the second-plate second edge 110 to de-elevate to a position such that the one or more springs 202 are compressed and the one or more hydraulic actuators 208 compress a hydraulic fluid that is used to perform work. In some instances, the one or more actuators 208 comprise one-direction actuators such that the hydraulic fluid is only compressed during a downstroke or only during an upstroke. In other instances, the one or more actuators 208 comprise bi-directional actuators such that the hydraulic fluid is compressed by the force acting on the second side 210 of the elevated first-plate second edge 108 and/or the second side 212 of the elevated second-plate second edge 110 causing the first-plate second edge 108 and/or the second-plate second edge 110 to de-elevate to a position such that the one or more springs 202 are compressed, and by the one or more springs 202 returning to their uncompressed state after the force is removed (i.e., the hydraulic fluid is compressed by the actuator 208 during both, the downstroke and the upstroke). In some instances, the compression of the first plate 102 and the second plate 104 creates a stroke length of approximately 2.5 inches for the one or more actuators 208.

Also, as shown in FIG. 2, the system comprises a stop 214, wherein the stop 214 prevents the force acting on the second side 210 of the elevated first-plate second edge 108 and/or the second side 212 of the second-plate second edge 110 from de-elevating the first-plate second edge 108 and/or the second-plate second edge 110 beyond a defined point. In other words, the stop 214 prevents the force from the vehicle 116 from damaging the one or more springs 202 and the one or more actuators 208. In some instances, the stop 214 may be an I-beam, such as an I-beam comprised of steel or other suitable material. In other instances, the stop 214 may be formed of material such as concrete.

Figure 3:
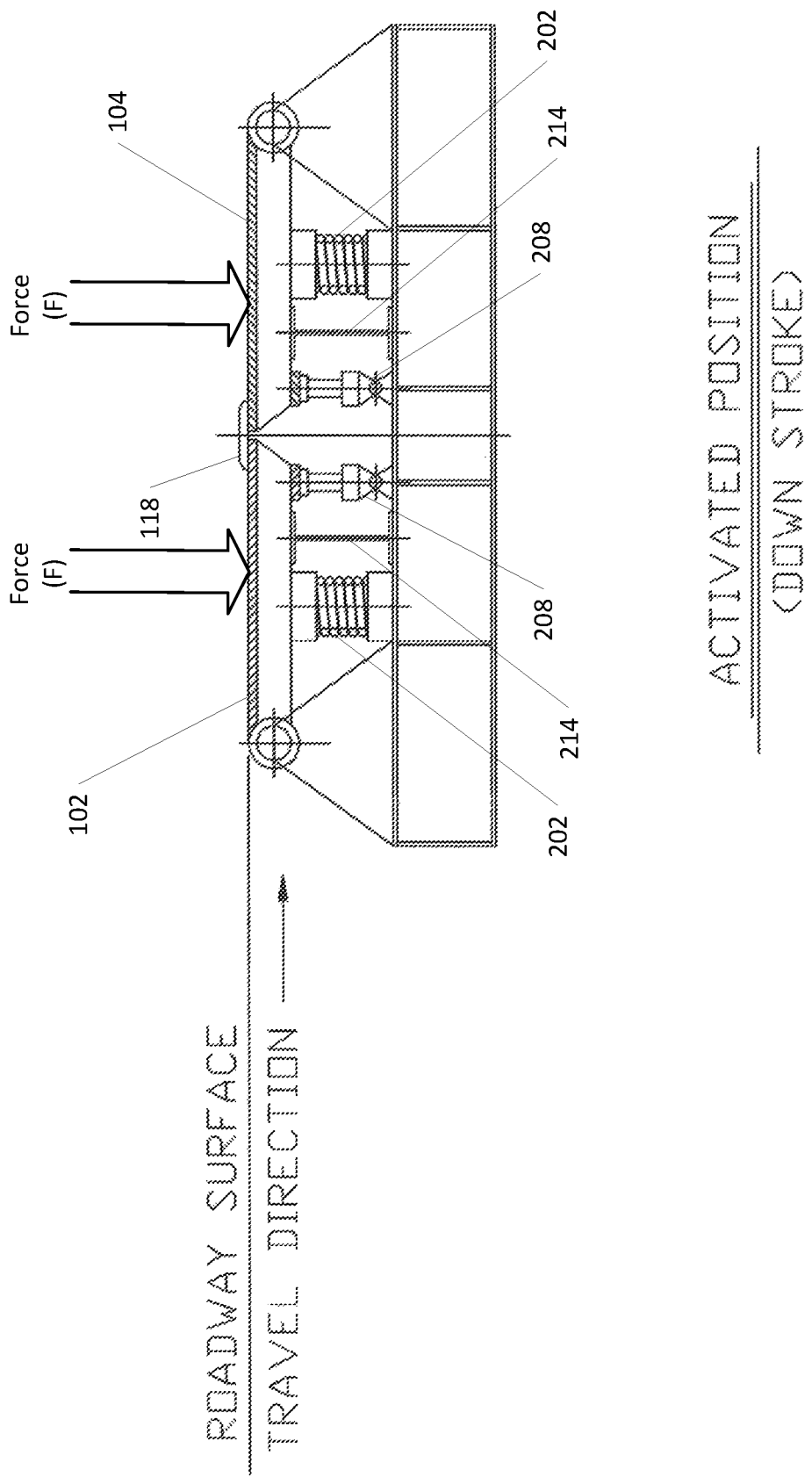
FIG. 3 is an elevation view of an embodiment of a system for compressing a hydraulic fluid used for performing work showing the system in an activated (or downstroke)position.

FIG. 3 is an elevation view of an embodiment of a system for compressing a hydraulic fluid used for performing work showing the system in an activated (or downstroke) position. In this view a force, F, is acting on one or both of the first plate 102 and the second plate 104. The force has compressed the one or more springs 202 until the first plate 102 and the second plate 104, or a portion or extension of the first plate 102 and the second plate 104 have come in contact with their respective stops 214. Further, the one or more actuators 208 have been compressed thereby compressing the hydraulic fluid, which is used for performing work. The actuators 208 may be bi-directional or one-direction actuators. Generally, the force, F, is caused by a vehicle driving over the first plate 102 and/or the second plate 104.

Figures 4A, 4B:
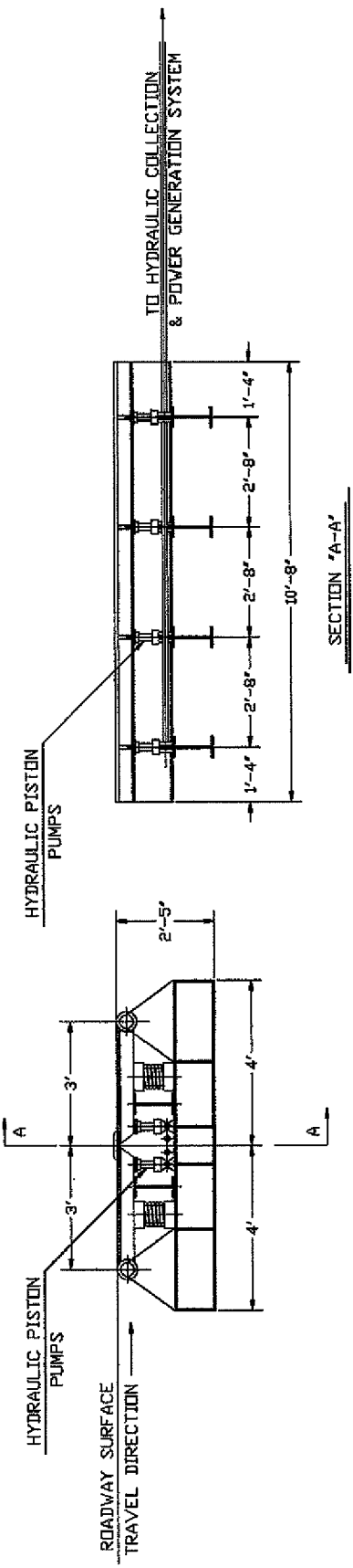
FIG. 4A is elevation view of an embodiment of a system for compressing a hydraulic fluid used for performing work showing dimensions of an exemplary embodiment.
FIG. 4B is a cross-section (AA) view of the system shown in FIG. 4A, also with exemplary dimensions.

FIG. 4A is elevation view of an embodiment of a system for compressing a hydraulic fluid used for performing work showing dimensions of an exemplary embodiment. FIG. 4B is a cross-section (AA) view of the system shown in FIG. 4A, also with exemplary dimensions. It is to be appreciated that these dimensions are non-limiting and various other embodiments of the system may have different dimensions.

Figure 5:
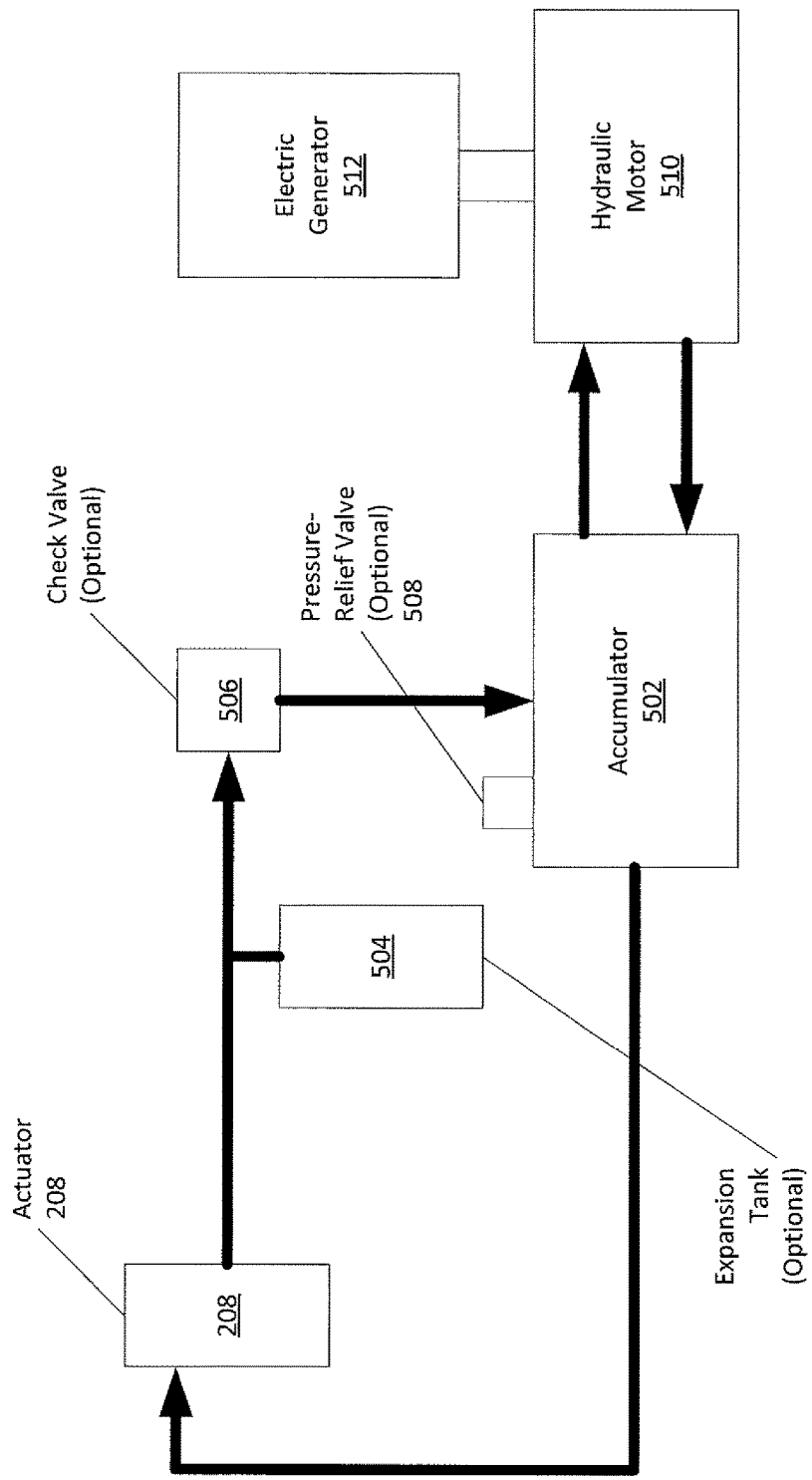
FIG. 5 is an illustration of an exemplary hydraulic collection and power generation system that can be used in conjunction with the embodiments of a system for compressing a hydraulic fluid used for performing work shown herein.

FIG. 5 is an illustration of an exemplary hydraulic collection and power generation system that can be used in conjunction with the embodiments of a system for compressing a hydraulic fluid used for performing work shown and described herein. As shown in FIG. 5, the one or more actuators 208 (shown in FIG. 5 as a single actuator 208) compress a hydraulic fluid. The compressed hydraulic fluid flows through piping to an accumulator 502, where it is stored until use to perform work. In some instances, the hydraulic fluid may flow through a series of actuators 208 where it is further compressed by each actuator 208 until arriving at the accumulator 502. In some instances, the hydraulic collection and power generation system may include an expansion tank 504, which helps to smooth and/or avoid pressure shocks to the piping. In some instances, the hydraulic collection and power generation system may include one or more check valves 506 that maintain flow of the hydraulic fluid in a single direction and avoid back-flows. In some instances, the accumulator 502 may include a pressure-relief valve such that the hydraulic collection and power generation system does not exceed a desired and defined pressure. The hydraulic collection and power generation system may be a closed-loop system such that the hydraulic fluid from the accumulator 502 flows back into the one or more actuators 208 for compression. The pressurized hydraulic fluid stored in the accumulator 502 is used to perform work. For example, it can be used to drive a hydraulic motor 510, which, in turn, can be used to generated electrical power using an electric generator 512. It is to be appreciated that the pressurized hydraulic fluid stored in the accumulator 502 can be used to perform work other than generating electricity.

Figure 6:
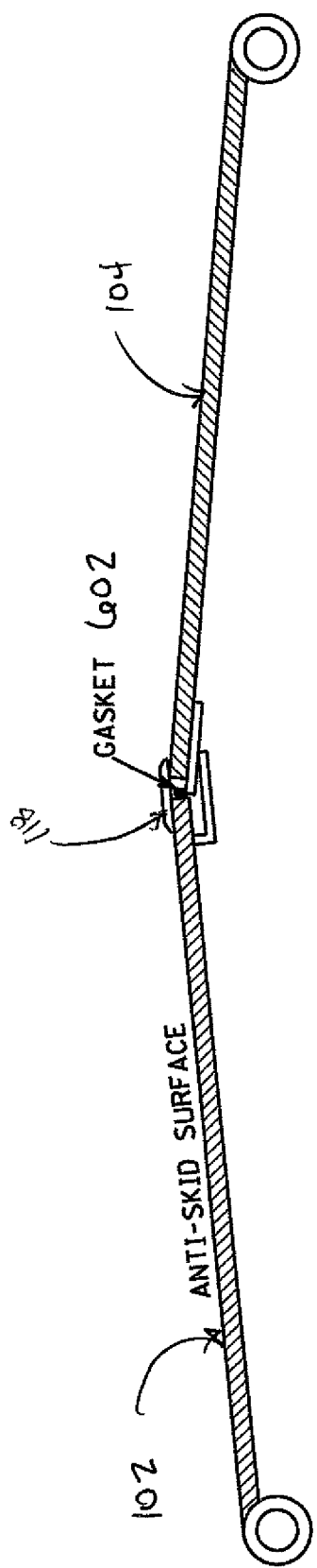
FIG. 6 is an illustration of an exemplary gasket between a first-plate second edge and a second-plate second edge of an embodiment of a system for compressing a hydraulic fluid used for performing work, which can be used to exclude foreign objects from an area underneath the first plate and the second plate.

In some embodiments, the system includes a gasket between the first plate 102 and the second plate 104. FIG. 6 is an illustration of an exemplary gasket 602 between the first-plate second edge 108 and a second-plate second edge 110 of an embodiment of a system for compressing a hydraulic fluid used for performing work. The gasket 602 can be used to exclude foreign objects from an area underneath the first plate 102 and the second plate 104. The gasket 602 may be comprised of flexible, semi-rigid, or rigid materials, as appropriate. In some instances, the extension 118 forms a part of the gasket 602. As further shown in FIG. 6, at least one or both of the first plate 102 and the second plate 104 may have a non-skid surface on the second side.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for compressing a hydraulic fluid used for performing work comprising:
   a first plate having a first-plate first hinged edge and a first-plate second edge opposite the first-plate first hinged edge;
   a second plate having a second-plate first hinged edge and a second-plate second edge opposite the second-plate first hinged edge, wherein the first-plate second edge and the second-plate second edge are proximate to one another and wherein the first plate and the second plate are embedded in a roadway;
   one or more springs in communication with a first side of the first plate and a first side of the second plate, wherein the one or more springs are configured such that in an uncompressed state the one or more springs elevate the first-plate second edge and the second-plate second edge to an elevation greater than an elevation of the first-plate first hinged edge and the second-plate hinged edge and wherein the elevation of the first-plate second edge and the second-plate second edge is approximately the same;
   one or more hydraulic actuators in communication with at least one of the first side of the first plate and/or the first side of the second plate, wherein a force acting on a second side of the elevated first-plate second edge and/or a second side of the elevated second-plate second edge causes the first-plate second edge and/or the second-plate second edge to de-elevate to a position such that the one or more springs are compressed and the one or more hydraulic actuators compress a hydraulic fluid that is used to perform work;
   a stop, wherein the stop prevents the force acting on the second side of the elevated first-plate second edge and/or the second side of the second-plate second edge from de-elevating the first-plate second edge and/or the second-plate second edge beyond a defined point;
   an accumulator, wherein the compressed hydraulic fluid is stored in the accumulator until the work is performed; and
   a check-valve between the one or more hydraulic actuators and the accumulator.

2. The system of claim 1, wherein the force acting on the second side of the elevated first-plate second edge and/or the second side of the elevated second-plate second edge comprises a vehicle traveling over the first plate and/or the second plate.

3. The system of claim 1, wherein the accumulator has a pressure-relief valve such that a pressure inside the accumulator does not exceed a designated pressure.

4. The system of claim 1, wherein the hydraulic fluid is used to perform work using a hydraulic motor.

5. The system of claim 4, further comprising an electric generator, wherein the hydraulic motor is used to generate electricity using the electric generator.

6. The system of claim 1, wherein the stop comprises an I-beam.

7. The system of claim 6, wherein the I-beam is comprised of steel.

8. The system of claim 1, wherein an angle formed between a plane of the roadway and the elevated first-plate second edge by the first-plate first hinged edge does not exceed 5 degrees.

9. The system of claim 1, wherein an angle formed between a plane of the roadway and the elevated second-plate second edge by the second-plate first hinged edge does not exceed 5 degrees.

10. The system of claim 1, wherein the one or more actuators comprise bi-directional actuators such that the hydraulic fluid is compressed by the force acting on the second side of the elevated first-plate second edge and/or the second side of the elevated second-plate second edge causing the first-plate second edge and/or the second-plate second edge to de-elevate to a position such that the one or more springs are compressed, and by the one or more springs returning to their uncompressed state after the force is removed.

11. The system of claim 1, further comprising a gasket between the first-plate second edge and the second-plate second edge to exclude foreign objects from an area underneath the first plate and the second plate.

12. The system of claim 11, wherein the gasket is comprised of flexible material.

13. The system of claim 11, wherein the gasket is comprised of rigid material.

14. The system of claim 1, wherein at least one or both of the first plate and the second plate have a non-skid surface on the second side.

15. The system of claim 1, wherein the first plate is a rectangle and the second plate is a rectangle.

16. The system of claim 1, wherein the elevation of the first-plate first hinged edge and the second-plate hinged edge is approximately the same and is approximately an elevation of the roadway.

17. The system of claim 1, wherein the first plate overlaps the second plate.

18. The system of claim 1, wherein the first plate has an extension that overlaps the second plate.

19. A system for compressing a hydraulic fluid used for performing work comprising:

a first plate having a first-plate first hinged edge and a first-plate second edge opposite the first-plate first hinged edge;

a second plate having a second-plate first hinged edge and a second-plate second edge opposite the second-plate first hinged edge, wherein the first-plate second edge and the second-plate second edge are proximate to one another and wherein the first plate and the second plate are embedded in a roadway;

one or more springs in communication with a first side of the first plate and a first side of the second plate, wherein the one or more springs are configured such that in an uncompressed state the one or more springs elevate the first-plate second edge and the second-plate second edge to an elevation greater than an elevation of the first-plate first hinged edge and the second-plate hinged edge and wherein the elevation of the first-plate second edge and the second-plate second edge is approximately the same;

one or more hydraulic actuators in communication with at least one of the first side of the first plate and/or the first side of the second plate, wherein a force acting on a second side of the elevated first-plate second edge and/or a second side of the elevated second-plate second edge causes the first-plate second edge and/or the second-plate second edge to de-elevate to a position such that the one or more springs are compressed and the one or more hydraulic actuators compress a hydraulic fluid that is used to perform work; and a stop comprising an I-beam, wherein the stop prevents the force acting on the second side of the elevated first-plate second edge and/or the second side of the second-plate second edge from de-elevating the first-plate second edge and/or the second-plate second edge beyond a defined point.

20. The system of claim 19, further comprising an accumulator, wherein the compressed hydraulic fluid is stored in the accumulator until the work is performed.

* * * * *